United States Patent
Ding et al.

(10) Patent No.: US 6,972,801 B1
(45) Date of Patent: Dec. 6, 2005

(54) SYSTEM AND METHOD FOR DEINTERLACING A VIDEO SIGNAL FOR DISPLAY ON PROGRESSIVE DISPLAY DEVICES

(75) Inventors: Wei Ding, Fremont, CA (US); Andy C. Hung, Los Altos, CA (US)

(73) Assignee: Intervideo, Inc., Fremont, CA (US)

( * ) Notice: Subject to any disclaimer, the term of this patent is extended or adjusted under 35 U.S.C. 154(b) by 635 days.

(21) Appl. No.: 09/693,351

(22) Filed: Oct. 20, 2000

(51) Int. Cl.⁷ .............................................. H04N 5/21
(52) U.S. Cl. ..................................................... 348/448
(58) Field of Search ................................ 348/448, 449, 348/458, 441, 459, 452, 450, 701, 604

(56) References Cited

U.S. PATENT DOCUMENTS

| | | | |
|---|---|---|---|
| 5,134,479 A | | 7/1992 | Ohishi |
| 5,257,103 A | | 10/1993 | Vogeley et al. |
| 5,574,504 A | * | 11/1996 | Yagasaki et al. ............ 348/415 |
| 5,621,470 A | | 4/1997 | Sid-Ahmed |
| 5,633,687 A | * | 5/1997 | Bhayani et al. ............. 348/441 |
| 5,796,437 A | * | 8/1998 | Muraji et al. ................ 348/452 |
| 5,864,369 A | * | 1/1999 | Swan ........................... 348/448 |
| 6,034,733 A | * | 3/2000 | Balram et al. ............... 348/448 |
| 6,037,990 A | * | 3/2000 | Ogawa et al. ............... 348/452 |
| 6,141,056 A | * | 10/2000 | Westerman ................. 348/448 |
| 6,166,772 A | * | 12/2000 | Voltz et al. .................. 348/448 |
| 6,359,654 B1 | * | 3/2002 | Glennon et al. ............. 348/448 |
| 6,380,978 B1 | * | 4/2002 | Adams et al. ............... 348/452 |
| 6,380,985 B1 | * | 4/2002 | Callahan ...................... 348/607 |
| 6,456,329 B1 | * | 9/2002 | Tinker et al. ................ 348/448 |
| 6,459,455 B1 | * | 10/2002 | Jiang et al. .................. 348/452 |

* cited by examiner

Primary Examiner—Paulos M. Natnael
(74) Attorney, Agent, or Firm—Rosenberg, Klein & Lee (57) ABSTRACT

A system and method for processing a video signal to make the corresponding image suitable for display on a progressive display device, i.e., a computer monitor, is disclosed. The processing system includes a video display module which is capable of processing an image frame based on the content of the frame information itself, or the values of the pixels that comprise the frame.

17 Claims, 7 Drawing Sheets

SYSTEM AND METHOD FOR DEINTERLACING A VIDEO SIGNAL FOR DISPLAY ON PROGRESSIVE DISPLAY DEVICES

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to digital media players and, more particularly, to a system and method for detecting interlaced video signals and processing such signals to make them viewable on progressive display devices.

BACKGROUND OF THE INVENTION

Figure 1A:
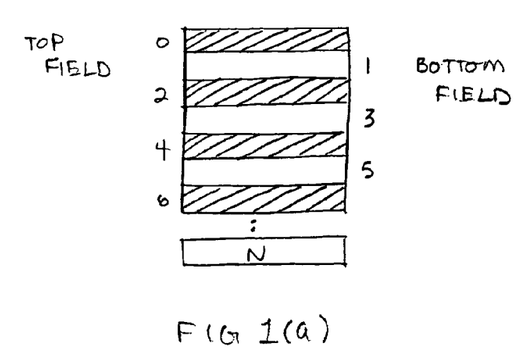
FIGS. 1(a)–1(b) are schematic representations of the components of a video signal.
Figure 1B:
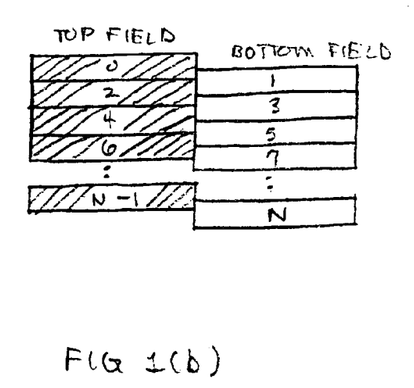

Conventional video signals provided from a standard television camera (NTSC signal) or a standard video camera are comprised of a series of frames. Each frame is comprised of two fields (top and bottom) having opposite polarity. Each field contains a series of pixels that contain data representative of the image present in each frame. The frames are interlaced in such a fashion that the top and bottom fields are configured either in sequential order as illustrated in FIG. 1(a), or adjacent to one another as illustrated in FIG. 1(b). The two fields represent images captured at different times. These interlaced frames represent the figures that are displayed on a suitable display device such as, for example, a television screen.

Figure 2B:
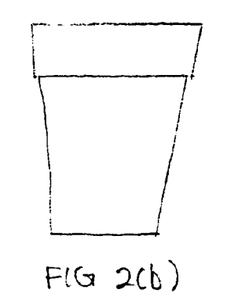
FIG. 2(b) is a schematic representation of the image illustrated in FIG. 2(a) as displayed on a progressive display device.

To maintain the image quality of a moving figure, an NTSC signal, for example, can only be displayed on an interlaced monitor such as a television screen or equivalent RGB screen. When images comprised of NTSC signals are displayed on progressive display devices, i.e. computer monitors, without processing, the frames that provide an NTSC image of a moving object such as, for example, the glass illustrated in FIG. 2(a) will appear on the progressive display devices as having jagged edges (or artifacts) as illustrated in FIG. 2(b).

SUMMARY OF THE INVENTION

The present invention is directed to a video display system and associated processing method that is capable of removing artifacts from a video signal, resulting in a filtered video signal that is capable of being displayed on progressive display devices. The artifacts are removed from an input video signal in a frame by frame fashion. Frame processing is performed in one of two fashions: (1) based on the information contained in each individual frame or (2) by an interpretive process based on the processing performed on a preceding number of adjacent frames. In an exemplary embodiment, artifacts are removed from an input video signal by: (a) obtaining the current frame information from an input video signal; (b) detecting the current frame delimiter from the input video signal; (c) determining whether the current frame is within a predetermined time interval; (d) determining the type of processing to be performed within the time interval from a corresponding table; and (e) generating a video frame signal in response to the predetermined parameters contained in the table.

In an alternate embodiment, artifacts are removed from an input video signal by: (a) separating a video image frame into its component fields; (b) determining which of the component fields is a first component field; (c) discarding the second component field of the video image frame; and (d) generating a combined video image frame signal based solely on the first component field.

The aforementioned signal processing steps are performed by a larger digital video system comprising a navigation unit operative to isolate an input video signal present on a digital media element provided therein; and a video unit operative to process the isolated video signal such that the video signal can be displayed on a progressive display device, the video unit comprising a decoder for separating the video signal into a plurality of frames, each frame containing a series of fields; and a video display module operative to process the fields based on information contained within each of the plurality of frames. In an exemplary embodiment, the video display module further includes a detection unit operative to determine the type of processing to be performed on the input video signal based on the fields.

An advantage of the present invention is that it provides the ability to view a conventional digital image on progressive display devices.

Another advantage of the present invention is that it provides the ability to process a conventional digital image during run time.

Still another advantage of the present invention is that it is simple to implement.

Yet still another advantage of the present invention is that it improves video signal processing efficiency.

BRIEF DESCRIPTION OF THE DRAWINGS

The aforementioned and related advantages and features of the present invention will become apparent upon review of the following detailed description of the invention, taken in conjunction with the accompanying drawings, where like numerals represent like elements, in which:

FIG. 2(a) is a schematic representation of an image provided on a conventional display device based on a conventional video signal;

DETAILED DESCRIPTION OF THE INVENTION

The video display system of the present invention will now be described with reference to FIGS. 3–12. In an exemplary embodiment of the present invention, the digital video display system comprises a digital versatile disk (DVD) player 10, including a navigation unit 12 coupled to a video unit 14. The video unit 14 provides a filtered video signal to a progressive display device 20 on line 21. In a preferred embodiment, the progressive display device 20 is a computer monitor. The video unit 14 includes a decoder 15 and a video display module 18. The video display module 18 performs the detection and signal processing functions of the present invention and provides the filtered video signal on line 21.

Figure 3:
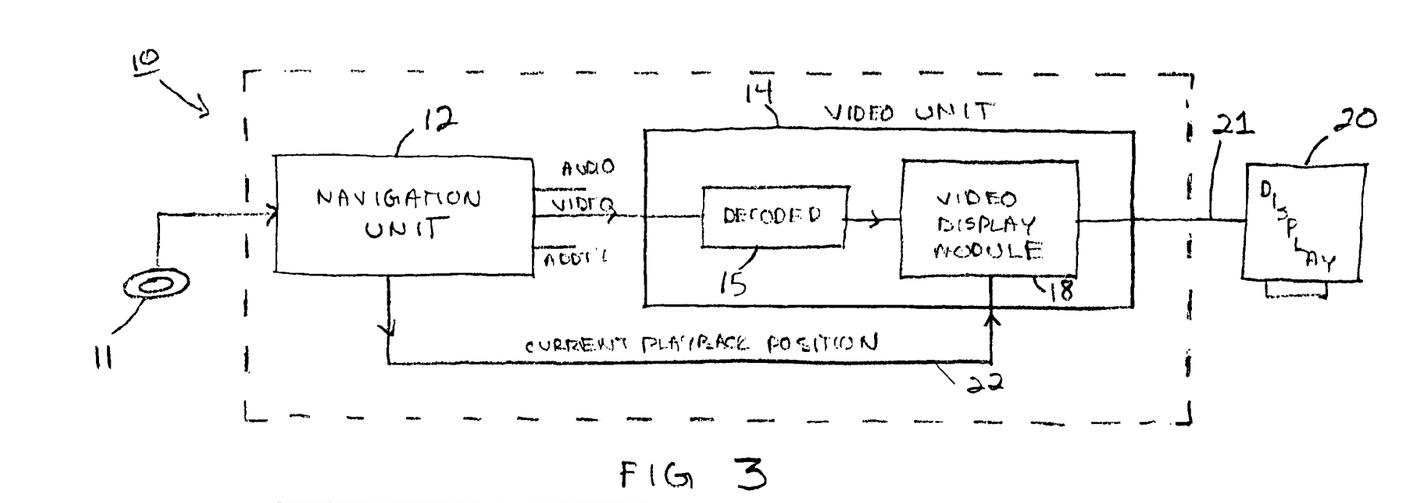
FIG. 3 is a schematic diagram of a video display system according to the present invention.

The navigation unit 12 accepts a digital media element such as, for example, a digital versatile disk 11 and is capable of providing the audio information stored on the versatile disk 11 on a first data line (AUDIO) the video information stored on the versatile disk 11 on a second data line (VIDEO), and any additional information stored on the versatile disk 11 on a third data line (ADDT'L). In operation, the navigation unit 12 is also capable of providing the current playback position of the versatile disk 11 being played by the DVD player 10 on line 22.

The video information present on the VIDEO line is transferred to the video unit 14 through the decoder 15. The decoder 15 is capable of separating the input video signal into a plurality of frames that make-up the input video signal. The plurality of frames have the same structure as the frames illustrated in FIG. 1(b). The video frames are then transferred to the video display module 18 for processing.

Figure 4:
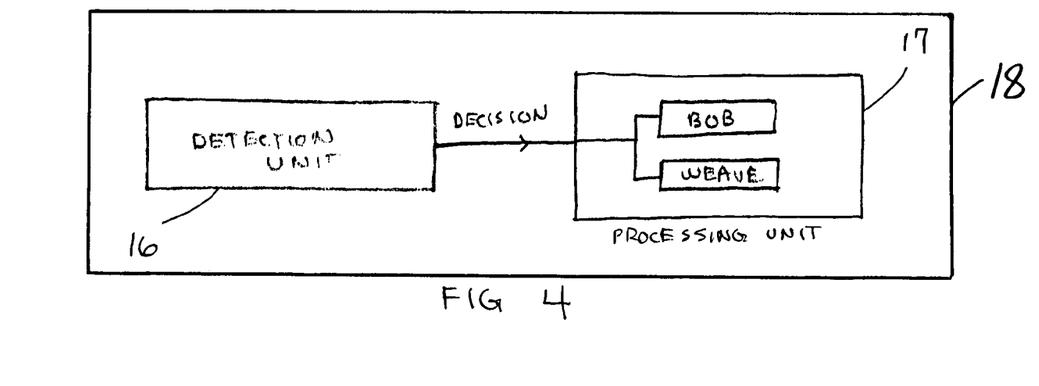
FIG. 4 is a block diagram of the detection and processing units of the video display module according to the present invention.
Figure 9:
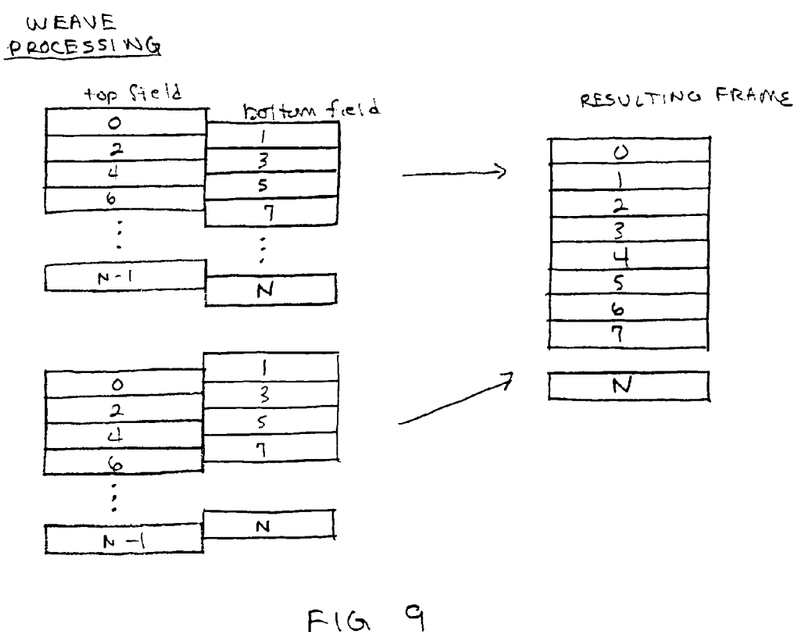
FIG. 9 is an illustration of WEAVE processing as performed on a digital video frame signal by the video display module according to the present invention.
Figure 10A:
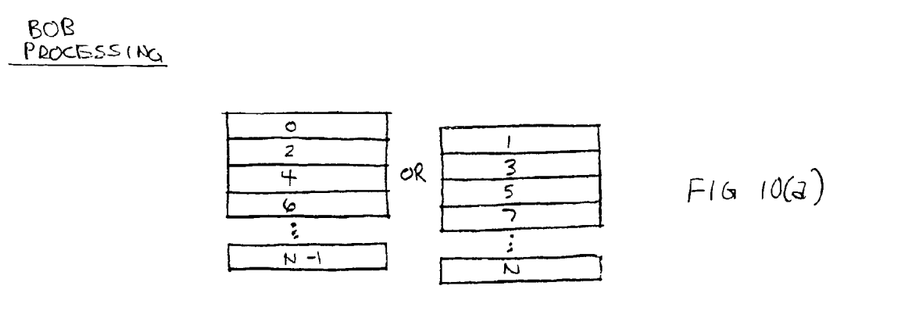
FIGS. 10(a)–10(c) illustrates BOB processing as performed on a digital video frame signal by the video display module according to the present invention.

The video display module 18 is comprised of a detection unit 16 (FIG. 4) and a processing unit 17 (FIG. 4). The detection unit 16 is capable of detecting the presence of a new video frame from the signal provided by the decoder 15 and to determine the type of processing (or filtering) that should be performed on such video frame. After determining the appropriate type of processing that needs to be performed on any given frame, such processing is then performed in the processing unit 17. In operation, the processing unit 17 performs two types of filtering on the video frame: (1) WEAVE signal processing (FIG. 9); or (2) BOB signal processing (FIG. 10). The appropriately filtered video frame is then provided to the computer monitor 20 on line 21.

Figure 5:
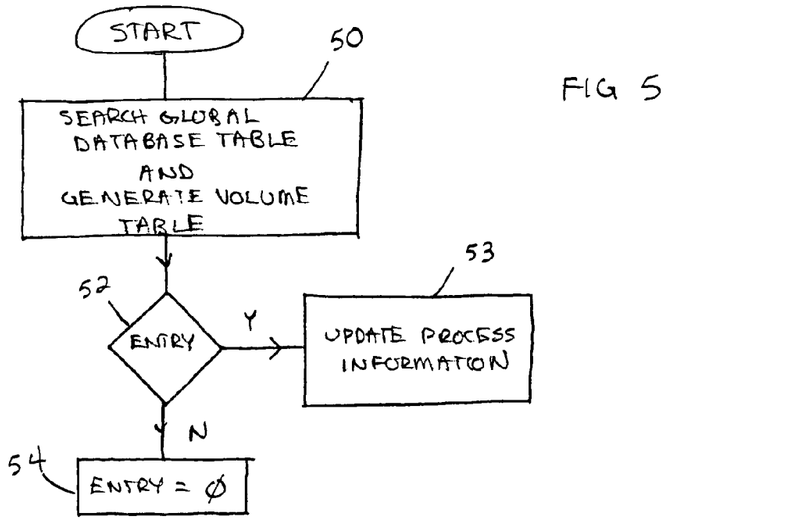
FIG. 5 is a flow chart of the operating steps performed by the video display module during initialization of the video display system.

The operation of the DVD player 10 of the present invention will now be described with reference to FIGS. 5–11. FIG. 5 is a flow chart of the operating steps performed by the video display module 18 of the present invention during initialization of the DVD player 10. The initialization routine illustrated in FIG. 5 is performed every time a versatile disk 11 is inserted into the navigation unit 12. In a first step 50 a Volume table is generated for the versatile disk being played. The Volume table is a database, or suitable look-up table, containing entries relating to the filtering that needs to be performed on the frames which comprise the images present on the versatile disk 11. Table 1 illustrates an exemplary Volume table.

TABLE 1

| DVD Volume Title | Title No. | Chapter | Start Time | End Time | Procession Decision |
|---|---|---|---|---|---|
| INTERVIDEO | 1 | 1 | $T_A$ | $T_B$ | BOB |
| INTERVIDEO | 1 | 2 | $T_C$ | $T_D$ | WEAVE |

As shown, in Table 1, the contents of the Volume table are indicative of the type of filtering that must be performed on the various frames that comprise the video signal that is present on the versatile disk 11. More specifically, the Volume table contains information on the title of the video being played, the frame number being currently played, the length of the frame being played and the type of filtering required to be performed on the frame during a given time interval.

After the Volume table has been generated, in step 52 the DVD player 10 next detects the presence of an entry in the Volume table which corresponds to the information (i.e. movie title) stored on the versatile disk 11. If the Volume table contains an entry which matches the title of the versatile disk 11, the processing (filtering) information maintained in the memory of the processing unit 17 (FIG. 4) is updated. If no match is detected, the particular entry in the Volume table is set to zero in step 54.

Figure 6:
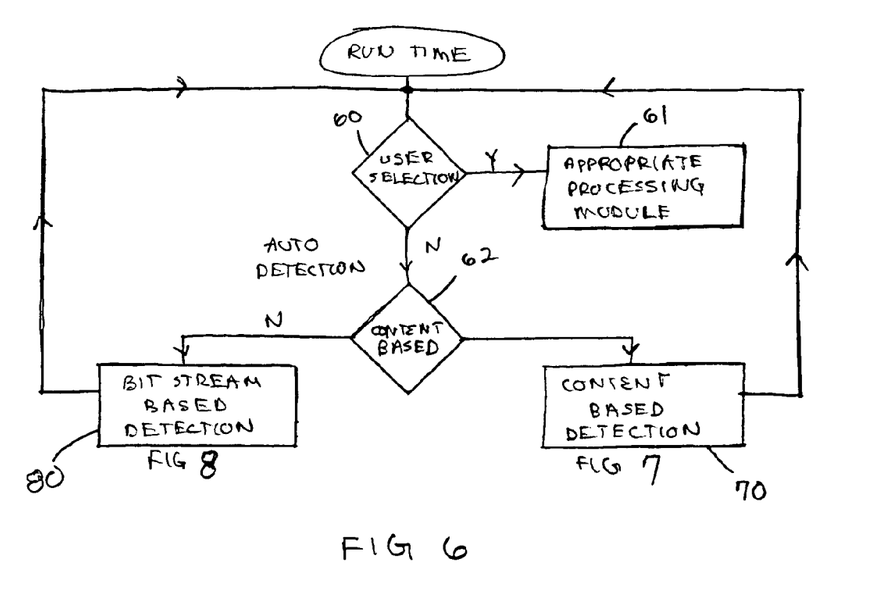
FIG. 6 is a flow chart of the operating steps performed by the video display module during run time of the video display system.

After initialization has been completed, the DVD player 10 knows what type of filtering needs to be performed on the input video signal during run time and when such filtering is to be performed. The DVD player 10 then enters the run time (or playback) phase of operation. FIG. 6 is a flowchart of the operating steps performed by the video display module 18 of the present invention during run time. At a first step 60, and at a predetermined time intervals during the playback of the versatile disk 11, the detection unit 16 (FIG. 4) of the video display module 18 checks whether the user has selected a particular type of video processing to be performed on the current frame. If the user has made a selection, control is then transferred to the selected video processing module at step 61. After control has been transferred in step 61, where appropriate, processing (BOB or WEAVE) are performed, as specified by user selection.

If no user selection was made or auto detection was selected in step 60, a determination as to whether content based detection should be performed on the current frame is made in step 62. If content based detection is to be performed on the current frame, control is then transferred to the content based detection module in step 70. If content based detection is not to be performed on the current frame, control is then transferred to the bit-stream based detection module in step 80. The content based detection algorithm and bit-stream based detection algorithm will be described in greater detail below.

Figure 7:
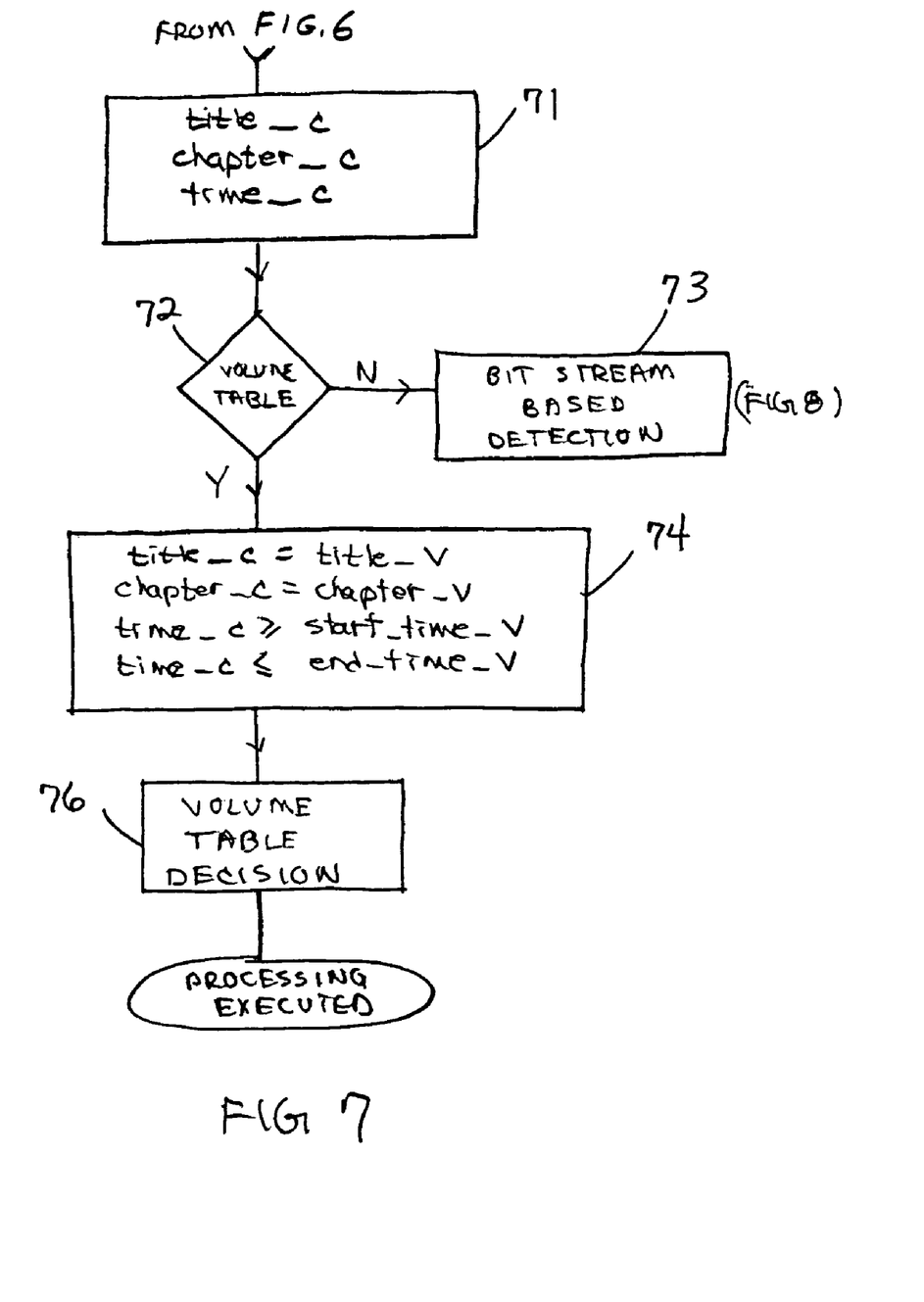
FIG. 7 is a flow chart of the operating steps performed by the video display module during content based detection.

As illustrated in FIG. 7, when content based detection is to be performed on the current frame, the detection unit 16 of video display module 18 retrieves the current playback position of the versatile disk 11 from the navigation unit 12. Next, the current title, chapter and frame time of the video being played are stored in the variables title_c, chapter_c and time_c, respectively in step 71. The current title_c, chapter_c and time_c information is obtained from the navigation unit 12 approximately every 30 ms. Next, in step 72, a determination is made as to whether there is a match between title_c, chapter_c and time_c and the data present in the Volume table generated during initialization. If there is a title and chapter match and time_c is between a predetermined start (start_time_v) and end (end_time_v) time in step 74, then the type of processing to be performed on the current frame is that provided by the Volume table in step 76.

Next, control is then transferred to the processing unit 17 (FIG. 4) where the particular type of signal processing listed in the Volume table, either BOB processing or WEAVE processing, is performed on the current frame. For example, referring to Table 1 provided above, by employing the content based detection algorithm of the present invention, the processing unit 17 will know that BOB processing is to be performed on the frame displayed during the $T_B$–$T_A$ time period and that WEAVE processing is to be performed on the frame being displayed during the $T_D$–$T_C$ time period as shown on the timeline below.

On the other hand, if no Volume table match is detected in step 72, control is then passed to the bit-stream detection algorithm in step 73 where bit-stream based detection is performed on the current frame. This content based detection scheme is very precise in that the particular type of video signal processing to be performed on a given frame is provided directly from the frame data contained within the Volume table. No additional calculations are required. In experiments performed by the inventors, processing of video frames using content based detection yielded images that have much better visual quality than conventional video frame signals.

Figure 8:
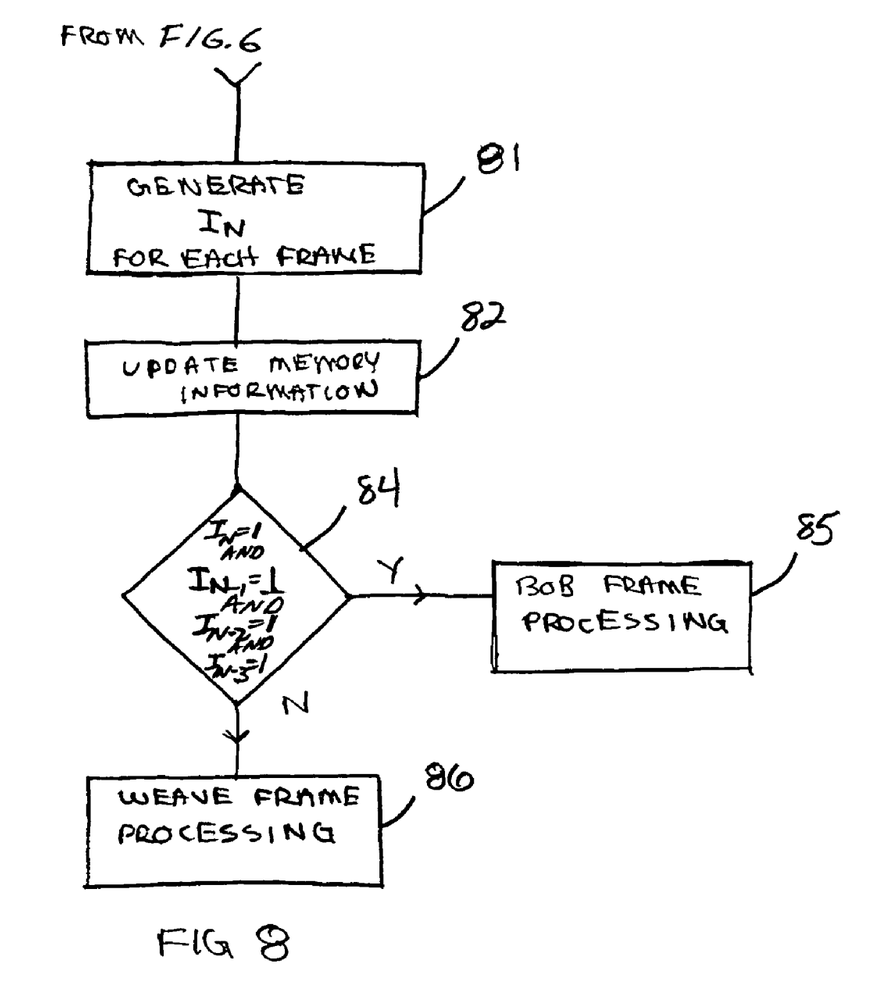
FIG. 8 is a flow chart of the operating steps performed by the video display module during bit-stream based detection.

Bit-stream based detection will now be described with reference to FIG. 8. As illustrated in greater detail in FIG. 8, when control is transferred to the bit-stream based detection algorithm, the detection unit 16 of the video display module 18 retrieves the current frame information from the decoder unit 15. For each frame, an interlace indicator $I_N$ is calculated in step 81 based on the following boolean expression:

$I_N$=NOT ((picture_structure=FRAME_PICTURE) AND progressive_frame)

where picture_structure is a variable obtained from the frame information contained on the versatile disk 11 and represents the structure of the current frame. More specifically, the picture_structure variable can have one of three values: FRAME_PICTURE, TOP_FIELD or BOTTOM_FIELD. Variables TOP_FIELD and BOTTOM_FIELD indicate which field of the current video frame is first. FRAME_PICTURE is a variable which indicates that the current frame is not separated into fields. Variable progressive_frame is obtained from the frame information contained on the versatile disk and is an indicator as to whether the current frame can be displayed on a progressive display device without any further processing. When progressive_frame has a value of 1 (true), this indicates that the present frame is already in a proper format to be displayed on a progressive display device. If progressive_frame is zero (false), this indicates that some type of processing (either BOB or WEAVE) needs to be performed on the current frame. The relationship between IN and the progressive_frame variable is represented graphically in Table 2 below.

TABLE 2

| $I_N$ | progressive_frame | picture_structure |
|---|---|---|
| 1 | 0 | — |
| 0 | 1 | FRAME_PICTURE |

After $I_N$ has been calculated in step 81, it is stored as the last entry in a first in first out (FIFO) memory in step 82, along with the calculated $I_N$ values of the three immediately preceding frames. Next, in step 84, a decision is made using the four stored IN values regarding what type of processing is to be performed on the current frame based on the following boolean condition:

($I_N$=TRUE) AND ($I_{N-1}$=TRUE) AND ($I_{N-2}$=TRUE) AND ($I_{N-3}$=TRUE)

Thus, if $I_N$, $I_{N-1}$, $I_{N-2}$ and $I_{N-3}$ are all 1 (TRUE), then control is transferred to processing unit 17 where BOB processing will be performed on the current frame in step 85.

On the other hand, if any of the $I_N$ values are a zero (false), then control will be transferred to the processing unit 17 where WEAVE processing will be performed on the current frame in; step 86. In the bit-stream detection method described above, $I_N$ is calculated for every frame, and the decision as to the type of processing to be performed on the current frame is always determined by comparing the current $I_N$ with the interlace indicator values of the three immediately preceding frames ($I_{N-1}$, $I_{N-2}$, and $I_{N-3}$). The signal processing that is performed by the processing unit 17 of the present invention will now be described with reference to FIGS. 9 and 10. FIG. 9 is an illustration of WEAVE processing that is performed on a video frame signal. As shown in greater detail in FIG. 9, the current frame to be processed is separated into two fields: a top field, which in a preferred embodiment is represented by field lines 0, 2, 4, 6 . . . N-1, and a bottom field represented by field lines 1,3,5,7, . . . N. In WEAVE processing, artifacts are removed from the current frame by taking the out of bound values (present in the pixels that comprise the field lines) and placing them within the proper field line. More specifically, as shown in FIG. 9, WEAVE processing takes the adjacent fields and concatenates them into a single video frame containing field lines 0–N.

FIG. 10 illustrates BOB processing that is performed on a current frame signal by the processing unit 17. In BOB processing, the current frame is first separated into its two respective fields (FIG. 10(*a*)). Next, a determination is made as to which of the respective fields occurs first. To determine whether the bottom field is the first frame field, the following boolean condition must be satisfied:

bBottomFirst=
 ((picture_structure=FRAME_PICTURE) AND
 (NOT top_field_first)) OR
 (picture_structure=BOTTOM_FIELD)

Thus, if variable picture_structure is set to BOTTOM_FIELD, then bBottomFirst is true. Also, if picture_structure is set to FRAME_PICTURE, indicating the current frame is not separated into fields, and top_field_first is not set, then bBottomFirst is also true.

If bBottomFirst is true, then the bottom field is used to construct the resulting video frame. Otherwise, the top field is used to construct the resulting video frame.

Figure 10B:
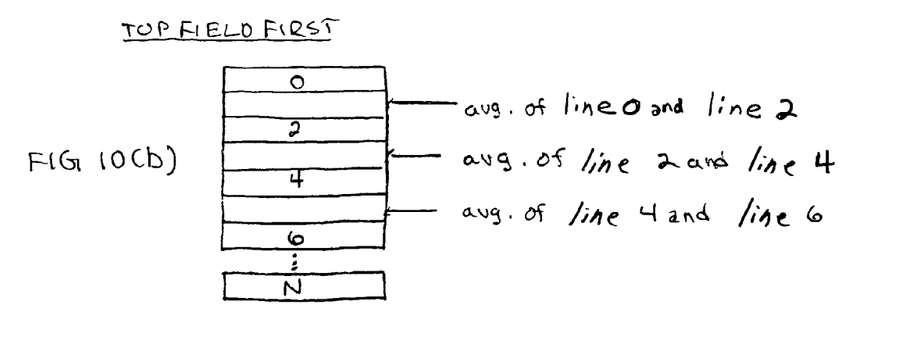
Figure 10C:
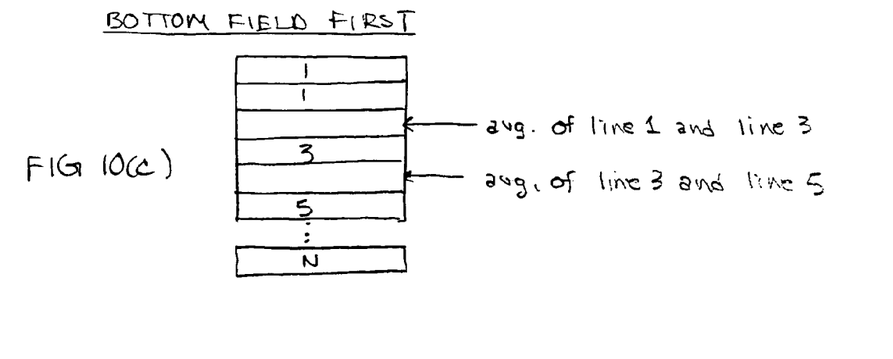

As illustrated by the boolean pseudocode above, BOB processing first determines which of the two frame fields is first. That first field is then used to generate the resulting video frame as illustrated in FIGS. 10(b) and 10(c). FIG. 10(b) represents the situation where the first field is the top field represented by field lines 0, 2, 4, 6, . . . N-1. As shown in FIG. 10(b), when the top field is the first field, the bottom field is discarded and the resulting video frame is constructed as follows: the first frame line is field line 0. The second frame line contains the average of the pixel values present in field line 0 and field line 2. The third frame line is field line 2. The fourth frame line contains the average of the pixel values present field line 2 and field line 4. The fifth frame line is field line 4. The sixth field line contains the average of the pixel values present in field line 4 and field line 6. The remaining field lines are generated as discussed above until the video frame is completed by having the last frame line be the last (or bottom field line) of the first selected frame. Thus, resulting frame lines 1,3,5, . . . N-1 contain values representative of the average pixel values contained in adjacent frame lines.

FIG. 10(c) illustrates the resulting frame when the bottom field is the first field. The resulting frame is constructed as follows: the first and second frame lines are represented by field line 1. The third frame line is a field line containing a value that is the average of the pixel values present in the second frame line (field line 1) and field line 3. Frame line 4 is represented by field line 3. Frame line 5 contains the average of the pixel values present in field line 3 and field line 5. The generation of the calculated field lines continues through the last frame line which is represented by original field line N. Thus, when the bottom field is the first field, the first two field lines of the resulting video frame are represented by the top field line of the original video frame.

Figure 11:
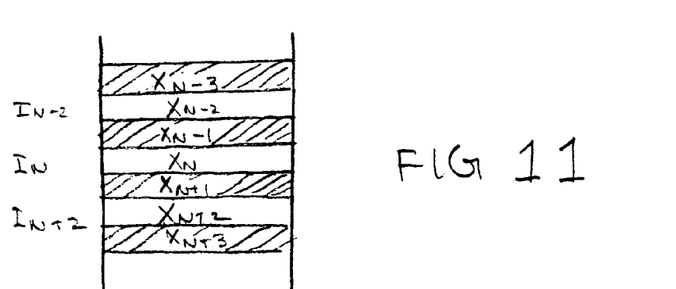
FIG. 11 illustrates BOB processing as performed on a digital video frame signed by the video display module according to an alternate embodiment of the present invention.

In an alternate embodiment of the present invention, the resulting video frame generated as a result of BOB processing can be represented as an n-tap low pass filter as illustrated in FIG. 11, where the pixel values of the intermediary frame lines $X_N$ are represented as follows:

$$X_N = (c_3 X_{n-3} + c_1 X_{n-1} + c_1 X_{n+1} + c_3 X_{n+3})/(c_1 + c_3 + c_3 + c_1)$$

where $c_3$ and $c_1$ are constants which are used to provide a weighted average for the pixels represented by $X_{n-3}$, $X^{n-}$, $X^{n+1}$ and $X_{n+3}$. In experiments performed by the inventors, it was determined that $c_1=3$ and $c_3=1$ provides the optimum values for the resulting video frame.

Figure 12:
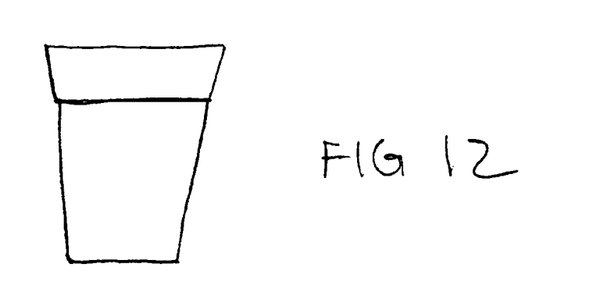
FIG. 12 is a schematic representation of an image as displayed on a progressive display device based on the filtered video signal generated by the video display module of the present invention.

Upon completion of either the BOB or WEAVE processing, the artifacts from each frame of the video signal will have been removed, thereby resulting in an image being displayed on a progressive display device, such as a computer monitor, having no jagged edges as illustrated in FIG. 12.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment disclosed, and that various changes and modifications to the invention are possible in light of the above teaching. Accordingly, the scope of the present invention is to be defined by the claims appended hereto.

What is claimed is:

1. A digital video display device, comprising:
   a navigation unit operative to isolate an input video signal;
   a decoder operative to separate said input video signal into a plurality of frames, each frame containing a series of fields;
   a detection unit having means for generating a look-up table from substantially all of said plurality of frames prior to processing any one of said plurality of frames for display, said look-up table having entered therein one of a plurality of processing types associated with a corresponding one of said plurality of frames, said plurality of processing types including a null processing type corresponding to no predetermined processing type associated with said corresponding frame, said detection unit further having means for providing an indication of said processing type entry corresponding to said each frame from said look-up table; and
   a processing unit operative to execute a first processing algorithm corresponding to said indication of said processing type entry, said processing unit providing at an output thereof a filtered video frame corresponding to one of said plurality of frames for display on a progressive display device, wherein said first processing algorithm produces said filtered video frame from field data of said corresponding frame and a predetermined number of preceding frames.

2. The device of claim 1, wherein said input video signal is isolated from a digital versatile disk (DVD) inserted into said navigation unit.

3. The device of claim 1, wherein said predetermined number of preceding frames used in said first processing algorithm is three.

4. The device of claim 1, wherein a second processing type entry induces execution of a second processing algorithm in said processing unit upon said indication thereof, said second processing algorithm producing said filtered video frame by concatenating said fields of said each frame.

5. A digital video display system, comprising:
   a navigation module operative to isolate an input video signal from a digital data stream;
   a decoder operative to separate said input video into a plurality of video frames;
   a detection module having means for generating a look-up table from substantially all of said plurality of video frames prior to processing any one of said plurality of frames for display, said look-up table having entered therein one of a plurality of processing types associated with a corresponding one of said plurality of video frames, said detection module further having means for providing an indication of said processing type entry corresponding to said each video frame from said look-up table, said detection module further including means for user selection of processing type for said each video frame, said user selection overriding said processing type entry thereof; and
   a processing module responsive to said indication of said processing type entry for providing a filtered video frame for display on a progressive display device, said filtered video frame processed in accordance with one of said processing type entry and said user selection of processing type.

6. The system of claim 5, wherein said processing module further comprises a first module operative to provide a video frame signal that is a concatenation of fields of an input video frame, and a second module operative to provide a video frame signal containing field segments having values based on the values of adjacent field segments.

7. The system of claim 5, wherein said detection module further includes means for determining the type of processing to be performed on said video frame based on field data of a predetermined number of prior video frames and said video frame.

8. The system of claim 7, wherein the predetermined number of prior video frames is three.

9. A video signal processing method, comprising the steps of:
obtaining current video information from an input video signal;
separating said input video signal into a plurality of video frames;
generating a look-up table from substantially all of said plurality of video frames prior to processing any one of said plurality of video frames, said look-up table having a plurality of processing type entries respectively storing an indication of a processing algorithm for processing field data of a corresponding one of said plurality of video frames;
retrieving one of said plurality of processing type entries corresponding to one of said plurality of video frames prior to the display thereof;
processing said one of said video frames in accordance with said processing algorithm indicated by said corresponding processing type entry; and
selectively overriding said processing type entry in said look-up table for any of said plurality of video frames with a user selection of processing type.

10. A method of processing a video signal to remove artifacts, comprising the steps of:
(a) separating a video image frame into its component fields, each of said component fields including a plurality of pixel lines;
(b) determining which of said component fields is a first component field, where said first component field is associated with a display time preceding that of a second component field;
(c) selecting one of either said first component field or said second component field of said video image frame for processing to a filtered video frame;
(d) setting pixel values of a first pixel line of said filtered video frame respectively to pixel values of a first one of said plurality of pixel lines of said component field selected in step (c);
(e) setting pixel values of a second pixel line of said filtered video frame respectively to pixel values of said first one of said plurality of pixel lines of said component field selected in step (c) if said selected component field is said second component field;
(f) generating a pixel line having pixel values equal to an average of corresponding pixels in each adjacent pair of pixel lines of said selected component field; and
(g) inserting said generated pixel line between said corresponding adjacent pair of pixel lines of said filtered video frame except said first pixel line and except said second pixel line if said selected component field is said second component field.

11. The device of claim 1, wherein said detection unit further includes means for user selection of processing type for said each frame, said user selection overriding said processing type entry thereof.

12. The device of claim 1, wherein a third processing type entry induces execution of a third processing algorithm in said processing unit upon said indication thereof, said third processing algorithm producing said filtered video frame from a sum of scaled field data of adjacent field segments of said each frame.

13. The device of claim 1, wherein said detection unit further includes means for determining the type of processing to be performed on said each frame based on field data in said each frame and a predetermined number of preceding frames.

14. The video signal processing method of claim 9, whereby said video frame processing step includes the step of concatenating fields corresponding to each frame when said processing type entry indicates a first processing algorithm.

15. The video signal processing method of claim 9, whereby said video frame processing step includes the steps of:
multiplying pixel values of each field line in each of said plurality of video frames by a corresponding scalar value; and
summing adjacent scaled field lines,
when said processing type entry indicates a second processing algorithm.

16. A digital video display device, comprising:
a navigation unit operative to isolate an input video signal;
a decoder operative to separate said input video signal into a plurality of frames, each frame containing a series of fields;
a detection unit having means for generating a look-up table from substantially all of said plurality of frames prior to processing any one of said plurality of frames for display, said look-up table having entered therein one of a plurality of processing types associated with a corresponding one of said plurality of frames, said detection unit further having means for providing an indication of said processing type entry corresponding to said each frame from said look-up table; and
a processing unit operative to execute a processing algorithm on said series of fields of said corresponding frame in accordance with said indication of said processing type entry and providing thereby for display on a progressive display device a filtered video frame corresponding one of said plurality of frames.

17. A video signal processing method, comprising the steps of:
obtaining current video information from an input video signal;
separating said input video signal into a plurality of video frames;
generating a look-up table from substantially all of said plurality of video frames prior to processing any one of said plurality of video frames for display, said look-up table having entered therein one of a plurality of processing type entries, each of said processing type entries respectively storing an indication of a processing algorithm for processing field data of a corresponding one of said plurality of video frames;
retrieving, successively, one of said plurality of processing type entries corresponding to each of said plurality of video frames prior to the display thereof; and
processing said field data of said one of said video frames in accordance with said processing algorithm indicated by said corresponding processing type entry.

* * * * *